United States Patent [19]
Johansson

[11] 3,944,490
[45] Mar. 16, 1976

[54] DIALYSIS APPARATUS FOR PURIFYING FLUID SUBSTANCES

[76] Inventor: Paul-Johny Johansson, Norbergsgatan 6, 223 55 Lund, Sweden

[22] Filed: Feb. 19, 1974

[21] Appl. No.: 443,469

[30] Foreign Application Priority Data
Dec. 10, 1973 Sweden .............................. 7316619

[52] U.S. Cl. .............................. 210/321 A; 210/541
[51] Int. Cl.² ............................................... B01D 13/00
[58] Field of Search ............................. 210/321, 541

[56] References Cited
UNITED STATES PATENTS

| | | | |
|---|---|---|---|
| 2,799,644 | 7/1957 | Kollsman | 210/321 X |
| 2,881,124 | 4/1959 | Tye | 210/321 X |
| 3,511,381 | 5/1970 | Alwall et al. | 210/321 |
| 3,547,271 | 12/1970 | Edwards | 210/321 |
| 3,738,495 | 6/1973 | Esmond | 210/321 |
| R26,097 | 10/1966 | Michaels | 210/321 |

*Primary Examiner*—Frank A. Spear, Jr.
*Assistant Examiner*—Ferris H. Lander
*Attorney, Agent, or Firm*—John J. Dennemeyer

[57] ABSTRACT

A dialysis apparatus for purifying a fluid substance, particularly blood, containing contaminants which are diffused through semi-permeable diaphragms into a purification liquid. The apparatus comprises first plates having planar surfaces respectively disposed between opposing second plates provided with bosses on the surfaces facing the planar surfaces of the first plates. A plurality of these plates is alternately assembled into a stack with a diaphragm arranged between the opposite surfaces of the first and second plates. Portions of the clamped diaphragm are forced between the bosses of the second plates a predetermined distance to define two channels for the circulation of the two fluids.

14 Claims, 7 Drawing Figures

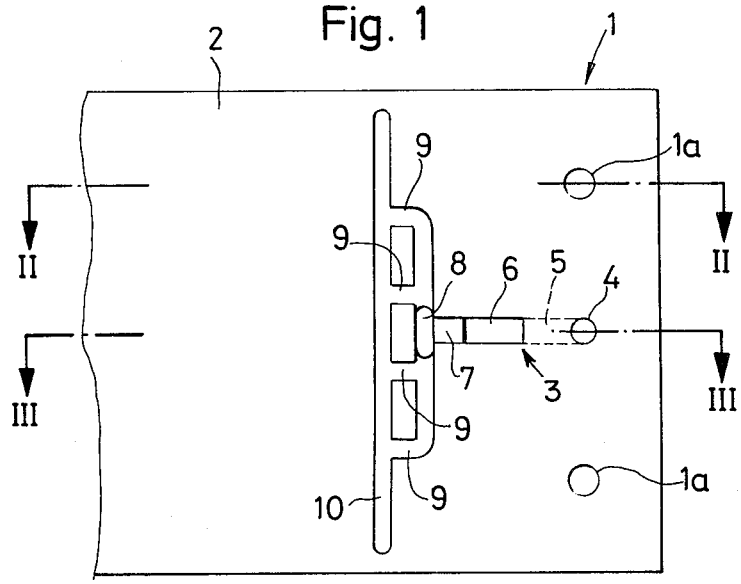
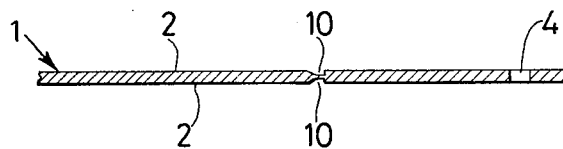
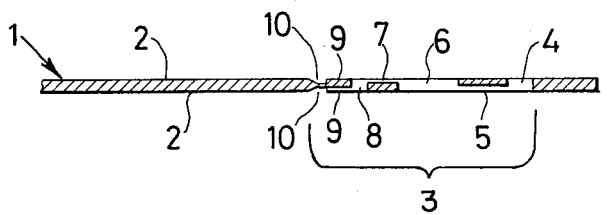

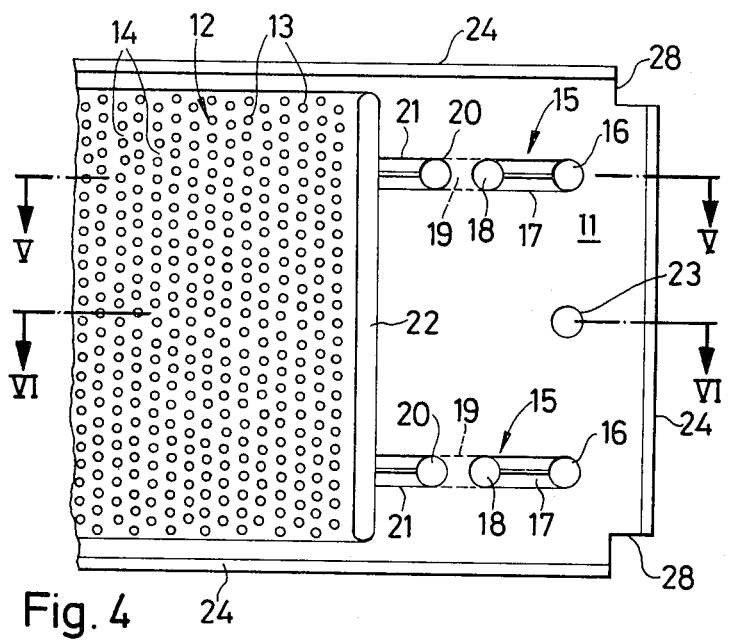
Fig. 4
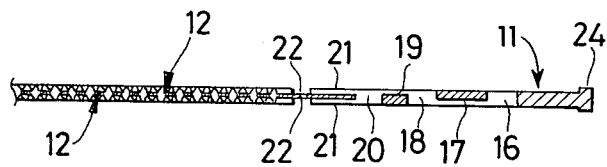
Fig. 5
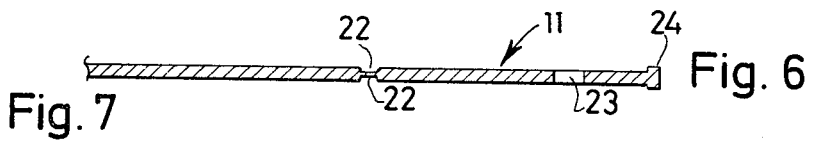
Fig. 6
Fig. 7
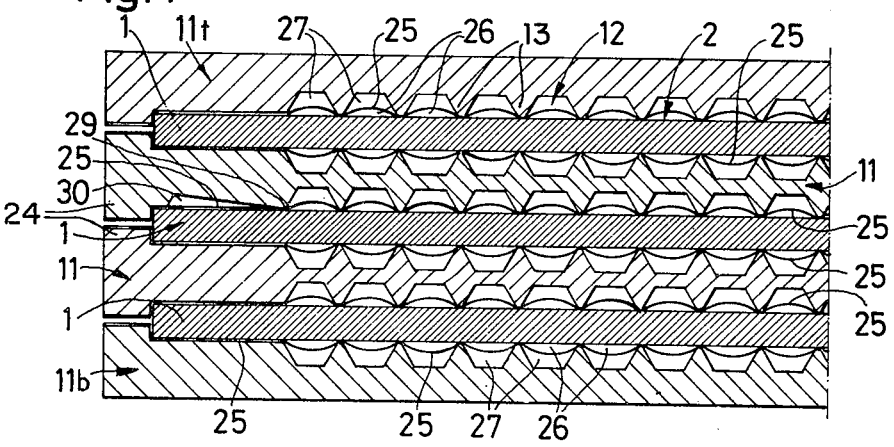

DIALYSIS APPARATUS FOR PURIFYING FLUID SUBSTANCES

The present invention relates to a dialysis apparatus for the purification of a substance, preferably blood, in which the contaminants present in the substance are caused to diffuse out through a semi-permeable diaphragm into a purifying substance, preferably a purifying liquid, to remove the contaminating ingredients.

The dialysis apparatus which works with semi-permeable diaphragms often includes a series of disc shaped elements provided with a passage system. A pair of semi-permeable diaphragms is disposed between each pair of disc shaped elements so that they engage the sides of the elements provided with the passage systems when the elements are placed in a package which is held together by clamping means or the like.

In dialysis apparatus of the type mentioned above it has been found difficult to cause the blood to flow so as to be uniformly distributed along all the parts of the disc shaped elements. The diaphragms have a tendency to extend relatively far into the passages in certain parts of the passage system while they extend into passages in other parts of the passage system to a substantially smaller extent. Furthermore, it is difficult to avoid that a portion of the diaphragm projects far into the passage system of an element and an opposing part of an adjacent diaphragm projects into the passage system of an adjacent element to a substantially smaller extent or only to an insignificant extent. As a consequence thereof, the through passages for the blood and the purifying liquid present an always varying depth which involves the risk that certain parts of the passage system are not traversed at all, resulting in an imperfect purifying effect and in certain cases leading to a coagulation of the blood.

Another disadvantage with the mentioned dialysis apparatus lies in the fact that the volume of the through passage area between the diaphragms is difficult and almost impossible to determine with the accuracy required. This means that the volume may become substantially greater than a previous estimate has indicated and as a result hereof the residual blood value may be substantial and a portion of the blood may remain in the dialysis apparatus after the treatment.

The object of the present invention is to eliminate these drawbacks and to provide a dialysis apparatus in which the volume for the passage of the blood may be more accurately determined and in which the design of the constituent elements is simplified.

The invention will be further described below with reference to the accompanying drawings, in which:

FIG. 1 is a plan view of an end portion of a first embodiment of a dialysis plate provided in the dialysis apparatus of the invention, FIG. 2 is a section along line II—II of the dialysis plate according to FIG. 1, FIG. 3 is a section along line III—III of the dialysis plate according to FIG. 1, FIG. 4 is a plan view of an end portion of a second embodiment of a dialysis plate provided in the dialysis apparatus of the invention, FIG. 5 is a section along line V—V of the dialysis plate according to FIG. 4, FIG. 6 is a section along line VI—VI of the dialysis plate according to FIG. 4, and FIG. 7 shows a section through an end portion of a dialysis apparatus composed of dialysis plates according to FIGS. 1 and 4.

According to the invention one of the two types of plates included in the dialysis apparatus comprises a plate 1 whose work surfaces 2, namely the surfaces to accomplish the purification action, are totally planar. Furthermore, the plate 1 is provided with a passage system 3 in two opposing planar end portions preferably to feed the substance to be purified (usually blood), and with a passage system (not shown) to discharge the purified substance (blood). Each passage system 3 (FIGS. 1 and 3) comprises a hole 4 passing through the plate 1, a communication channel 5 extending along one side of the plate 1, a channel 6 passing through the plate 1, a channel 7 extending along the second side of the plate 1, a pressure equalizing hole 8 extending through the plate 1 and distribution passages 9 which are provided on both sides of the plate and open into a distribution channel 10 on each side of the plate 1. Two passage holes 1a are provided in both end portions of the plate 1 to permit the flow of purification substance (dialysis liquid). Preferably the plate 1 is made from a material that is or has been made free from bacteria, such as stainless steel or a plastic material.

Furthermore the dialysis apparatus according to the invention includes a plurality of second type plates 11. Said plates 11 are to be alternately interleaved with plates 1, and are provided with a passage system 12 on at least one of the sides thereof passages 14 (FIG. 4) being defined in this passage system 12 by means of bosses. Plates having the passage system 12 preferably on only one side are designated 11t and 11b in FIG. 7 and designate top and bottom plates respectively of an assembly to be further described. Preferably said bosses consist of cylindrical pins 13, which are placed side by side in rows directed transversely to the direction in which the substance is to flow primarily. Preferably the pins 13 of each row are offset in relation to the pins in the next row in such a manner that substances flowing between the pins are given sinuously varying directions of the side flow in relation to the direction of the main flow.

Furthermore, each plate 11 is provided with two passage systems 15 in a common planar end portion thereof to feed a purification substance (dialysis liquid), and the plate 11 is also provided with two passage systems (not shown) in an opposing, planar end portion to discharge the purification substance (contaminated dialysis liquid). Each passage system 15 comprises a hole 16 passing through the plate 11, a channel 17 in one side of the plate 11, a hole 18 passing through the plate 11, a channel 19 in the other side of the plate 11, a pressure equalizing hole 20 passing through the plate 11 and a channel 21 that is provided in each side of the plate 11 and opens into a distribution channel 22 to distribute a purification substance along the width of the passage systems 12. The plate 11 is provided also with holes 23 in the planar end portions thereof for the substance to be purified (blood) and this plate has transversely outwardly extending edge flanges 24.

To assemble the dialysis apparatus, a bottom end plate 11b is placed in a lowermost position and is preferably provided with a passage system 12 on only one side of the plate. Such a design is shown in FIG. 7, and a diaphragm 25 is placed thereupon so that it covers the passage system 12. The planar portion of the plate 11 surrounds the passage system and preferably projects past it and terminates in edge flanges 24. One of the plates 1 is placed upon the diaphragm 25 during assembly and is so dimensioned that the same fits between the edge flanges 24 of the plate 11. Another diaphragm 25 is then placed upon the first plate 1 and upon this another plate 11 is placed provided with passage systems 12 on both sides thereof. Thereafter, a thrid diaphraphm 25 is mounted on the plate 11 followed by another plate 1, a fourth diaphragm 25 and so forth, and the resulting interleaved stack of plates 1, 11, and of interposed diaphragms provided in between, is completed with a top end plate 11t provided with a passage system 12 on only one side thereof. The stack is placed in a surrounding apparatus (not shown) having at least one clamping means (not shown) that may be clamped to hold the plates of the stack together with a predetermined tension force. Preferably, the bosses of the plates 11 are shaped as cones and further the plates 11 are made from such a material that the cones become frusto-conical when they are pressed against the plates 1 through the diaphragms by the clamping of the stack. In case the cones are already somewhat frusto-conically shaped beforehand, the area of the frustum may be increased by the clamping action. This deformation of the bosses permits all the bosses to hold point-wise the diaphragms engaging the work surfaces 2 of the plates 1.

After the clamping of the stack the passages are opened to deliver and discharge blood and purification liquid and this is accomplished by making holes in the diaphragms 25. The hole making tool (not shown) may preferably comprise a tube piece with an obliquely cut end edge that is passed through the aligned holes 16, 1a and, 23, 4 respectively, of the plates whereby holes are made in the diaphragms 25 provided therebetween. A blood feeding line (not shown) is connected to the passages defined by the holes 23, 4 and corresponding holes in the diaphragms 25 so that blood flows in through the passage systems 3 along the work surfaces 2 and out through a blood discharge line. A feed line (not shown) for feeding the purification liquid is connected to the passages defined by the pairs of holes 16, 1a and corresponding holes in the diaphragms 25 to permit this flow through the passage systems 15, the passage systems 12, through the passage systems in the other end portion of the plate 11 and out through liquid discharge lines (not shown).

In the embodiment exemplified above and according to the principle of the invention the diaphragms are secured by the collective cooperation of bosses 13 together with some planar end portions of the plates 11 by their bearing against the planar work surfaces 2 of the plates 1. The securing is accomplished in certain points throughout the passage system 12 and between these points the diaphragms may bow or bulge into the passages 14 between the bosses 13 in a manner determined by the yielding characteristics of the diaphragms 25 and their tension. In relation to these facts, the diaphragms may be caused to sink down a predeterminable amount generally uniformly throughout the whole area for the passage system 12 thereby subdividing the latter into a system of dual passages. As can be seen beter in FIG. 7, one set of the passages forms blood flowing passages 26 adjacent the work surface 2 of the plate 1, the total flow area of which may be exactly determined. At the same time passages 27 for a dialysis liquid are formed in the remainder portion of the passages 14 of the plates 11.

Thus the importance of the invention lies in that one type of plate has at least one planar work surface and through passages are defined between this surface and the diaphragms. As a result the blood residual value may be reduced, blood may be prevented from coagulating during the treatment and may be prevented from remaining in the dialysis apparatus after the treatment. Furthermore, at least one plate 11 may be included as an aid to each plate dialysis apparatus, whereby the bosses of the plates have a distance and/or a height to each other such that it differs from the distance and/or the height relative of the bosses of another or the rest of the plates. In such a manner the flow volume of the dialysis apparatus may be varied while maintaining the plates 1.

In order to facilitate the assembly and/or the clamping moment of the diaphragms 25, all or some of the plates may be provided with cut or convexly rounded corners, or corners with recesses 28, at the same time as the diaphragms 25 are dimensioned to project outside the cuts, rounded corners or recesses of the plates with the corner portions thereof, so that these may be handled when the plates have been mounted in their relative positions.

The embodiment described above may be varied within the scope of the appended claims. Thus the fluid substance to be purified (blood) may be fed between the diaphragms 25 and the plates 11 and the purification medium (dialysis liquid) may be fed between the diaphragms 25 and the plates 1. The bosses of the plates 11 may comprise extended ribs, which are parallel to each other to define extended straight lined passages between the diaphragms 25 and the plates 11 for dialysis liquid or blood. Also some or both types of plates 1, 11 may be provided with raised beams which engage a planar portion of the next plate by means of adjacent diaphragms 25. The raised beams preferably run around the passage system 12 and/or the work surface 2 and may be designed to flatten upon clamping of said stack. Alternatively, the same may be provided to run into a complementary groove in the next plate. The raised beams are provided to define or enclose the passage systems defined by the diaphragms 25. This enclosing definition may alternatively be accomplished by providing the plates 11 with a raised beam 29 outwardly adjacent the passage system 12. Such a raised beam 29 is defined in part by providing at the outer side thereof a recess 30 in the plate 11 outside the passage systems 12. This means that a good sealing definition of the passage system is obtained when the plates are assembled and clamped against each other. Finally, the diaphragm 25 may be of such a shape that each diaphragm 25 surrounds at least one of the plates, for example each diaphragm may be shaped as a bag into which a plate (preferably the plate 1) may be inserted.

What is claimed is:

1. A dialysis apparatus embodying interleaved plates and flexible semi-permeable diaphragms for purifying a fluid, preferably blood, which contains contaminants that are caused to diffuse out through the semi-permeable diaphragms into a purification fluid, to remove the contaminating substances, said apparatus comprising:

at least one first type plate element (1) with at least one planar work surface (2);

at least one second type plate element (11) with an interrupted non-planar work surface formed by a plurality of upstanding bosses (13) to collectively help define at least one passage system (12) relative to said second plate element work surface;
said first plate element work surface extending coextensively with and fully across said passage system;
a relatively flexible semi-permeable diaphragm (25) having a medial portion thereof positioned to lie between and to sealingly separate the respective plate element work surfaces (2, 13) from one another;
said diaphragm (25) being sandwiched and held against the planar work surface (2) of said first plate element (1) by the bosses (13) of said second plate element (11);
said diaphragm disposed so as to form and define first fluid-flow passages (26) between said diaphragm (25) and planar work surface (2), and to form second fluid-flow passages (27) between said diaphragm and said bossed work surfaces (13);
said first passages (26) adapted to convey one of the fluids, and said second passages (27) adapted to convey the other of said fluids; and
wherein the first plate element (1) is somewhat smaller peripherally than said second plate element (11), and the latter is provided with transversely extending peripheral edge flanges (24) defining a generally recessed area within said peripheral edge flanges (24) corresponding essentially to the area of said first plate element (1) for receiving a membrane-covered first plate element (1) therein, and for facilitating proper orienting and securing said first plate element (1) in relation to said second plate element (11).

2. An apparatus according to claim 1, wherein said first passages (26) are adapted to convey the fluid substance to be purified, and said second passages (27) are adapted to convey the purification fluid.

3. An apparatus according to claim 1, wherein the bosses of the second plate element (11) are shaped as generally tapered cylindrical pins (13), said pins (13) disposed in adjacent rows and having spaced apart portions projecting transversely to the direction in which the fluid flows primarily, and said pins (13) of one row being offset in relation to the pins (13) of the next row so that the flow of the fluids through the pins (13) is varied in a lateral direction in relation to a linear direction of the main flow.

4. An apparatus according to claim 1, wherein the bosses of the second shaft element (11) are shaped as extended ribs directed parallel to each other.

5. An apparatus according to claim 1, including a plurality of said first and second type plate elements having said diaphragms disposed therebetween and arranged in a clamped-together stack, wherein said first plate elements (1) have planar work surfaces on opposing sides, and said second plate elements (11) are provided with interrupted work surfaces (13,14) on faces disposed in contiguously adjacent relationship to said planar work surfaces of said first plate elements which provide passage systems (12) on two opposed sides of said first plate element.

6. An apparatus according to claim 5, wherein said second plate element bosses (13) of each work surface have a predetermined lateral spacing distance and a predetermined height in relation to each other so that the volume of the passages for the fluids may be varied by replacing with a second plate element (11) having predetermined different relative spacing and sizes of said bosses.

7. An apparatus according to claim 6, wherein said second type plate elements (11) are made from such a material that at least free end portions of the bosses (13) are deformable when said first (1) and second (11) plate elements are pressed against each other and with diaphragm (25) interposed therebetween.

8. An apparatus according to claim 5, wherein the peripheral edge portions of said plate elements (1 and/or 11) are provided with at least one marginal recess (28) and the diaphragm (25) is of a size so as to have a marginal portion project into said marginal recess, saidd recess preferably being in corner portion thereof in order to stretch and/or direct the diaphragm (25) when said plate elements are in assembled stacked relation.

9. A dialysis apparatus embodying interleaved plates with flexible semi-permeable diaphragm means interposed between opposed faces of said interleaved plates, for purifying a contaminated fluid substance, such as blood, whereby the contaminants are diffusible through the semi-permeable diaphragm means into a purifying fluid, said apparatus comprising in combination:
  a. first and second sets of different types of generally planar flow plate elements disposed in clamped parallel relation to one another, and including
    1. at least one plate element of a first type;
    2. at least one pair of second type plate elements;
  b. said first type plate element being interleaved in slightly spaced apart relation and peripherally sealed by said diaphragm means relative to said second type plate elements interposed therebetween;
  c. said different types of flow plates having operatively engageable cooperative surface means to form therebetween on opposite sides of said first type plate element an interrupted flow passage system in at least generally medial portions thereof;
  d. said diaphragm means including a diaphragm member having at least medial portions which are deformable to a predeterminable extent and disposed so as to form and define between respective of said cooperative surface means within said flow passage system both first and second fluid-flow passages through which passages said fluid to be purified and said purification fluid are separately conveyable;
  e. said interleaved plate elements each having separate sets of intercommunicating fluid passages which also intercommunicate with and form part of said interrupted flow passage system of paragraph (c); said separate sets of intercommunicating flow passages adapted to convey into and out of said apparatus the respective fluid to be purified and the purification fluid, in a non-intermingling character;
  f. said first type flow plate element being of an overall lesser size than said second type flow plate elements; and
  g. said second type flow plate elements having elongated marginal boss means projecting transversely a limited extent and positioned so as to orient and form recessed planar pocket means for receiving said first type flow plate therein in fluid sealed relation by said membrane means and for facilitating correct interleaved parallel and predetermined relative relationship of said flow plate elements.

10. The apparatus of claim 9, wherein said cooperative surface means of paragraph (c) includes on one type of said different type plate elements a plurality of transversely projecting boss means with free ends operatively engageable via said diaphragm means with said cooperative surface means of the other of said different types of plate elements.

11. The apparatus of claim 10, wherein said boss means includes alternately staggered rows of generally conical pins.

12. The apparatus of claim 11, wherein said boss means are of a material such that at least the free end portions thereof are slightly deformable to assume frusto-conical shape when said plates are in clamped interleaved assembled relationship.

13. The apparatus of claim 10, wherein said flexible diaphragm means comprise diaphragm members, and wherein a plurality of said first type and second type of plates are alternately interleaved and in sealed relative relationship to one another by marginal portions of the respectively interleaved diaphragm members.

14. The apparatus of claim 10, wherein said diaphragm means include a bag-like diaphragm member of a size to closely envelope said first type flow plate elements when in assembled relationship with said apparatus.

* * * * *